United States Patent Office 3,518,877
Patented July 7, 1970

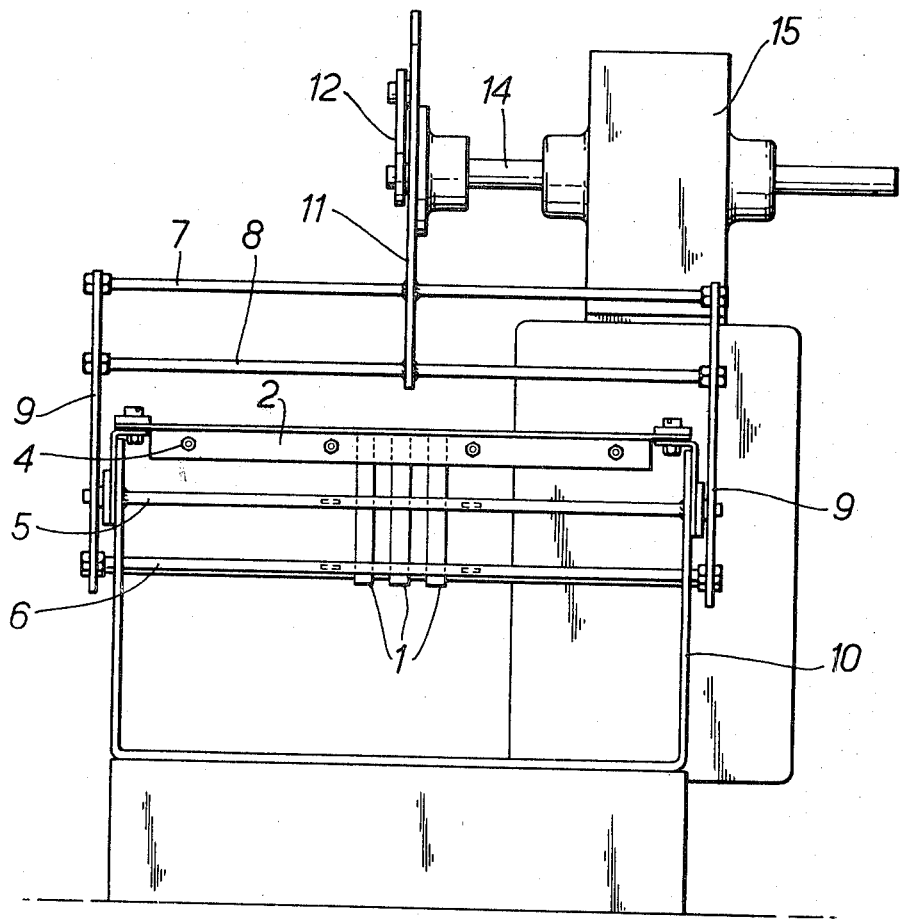

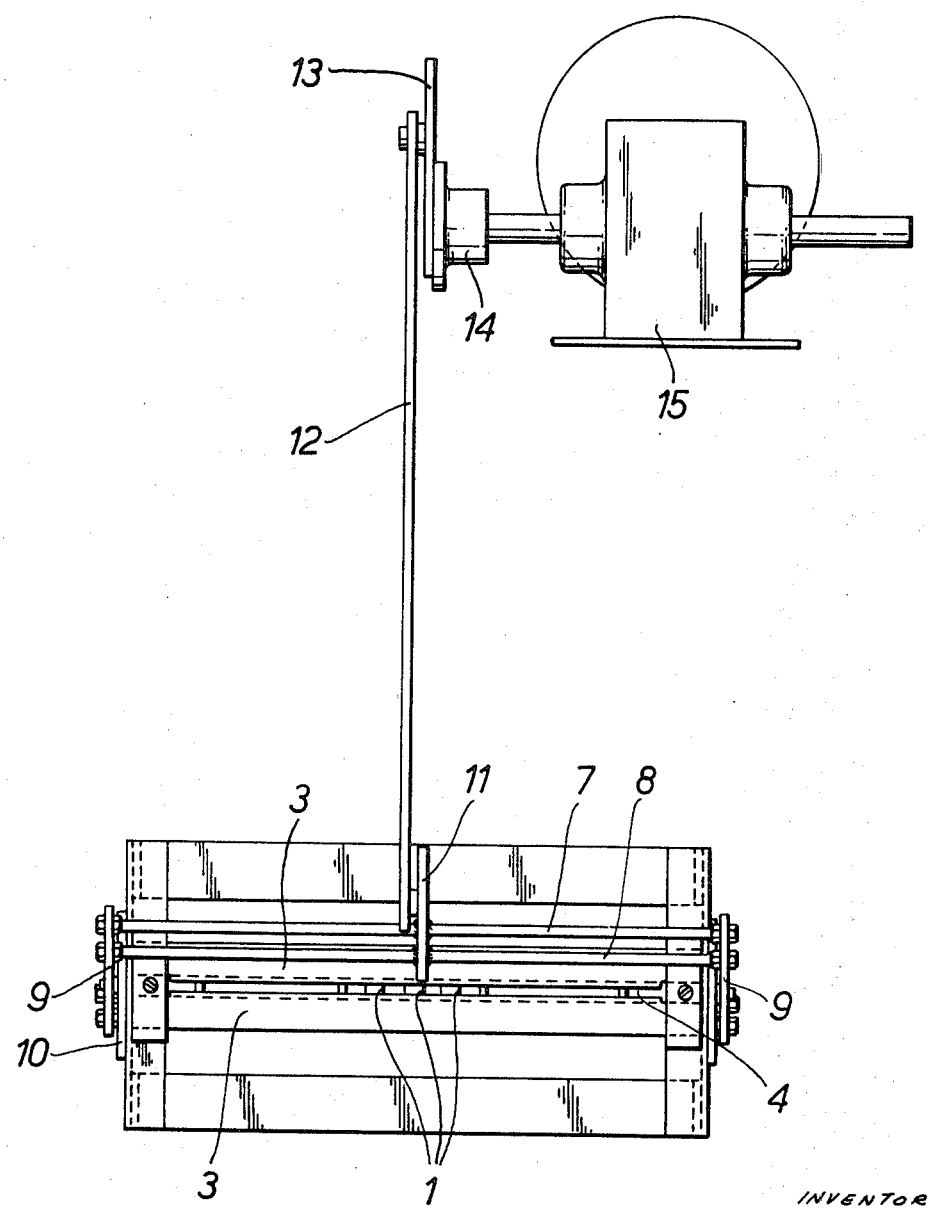

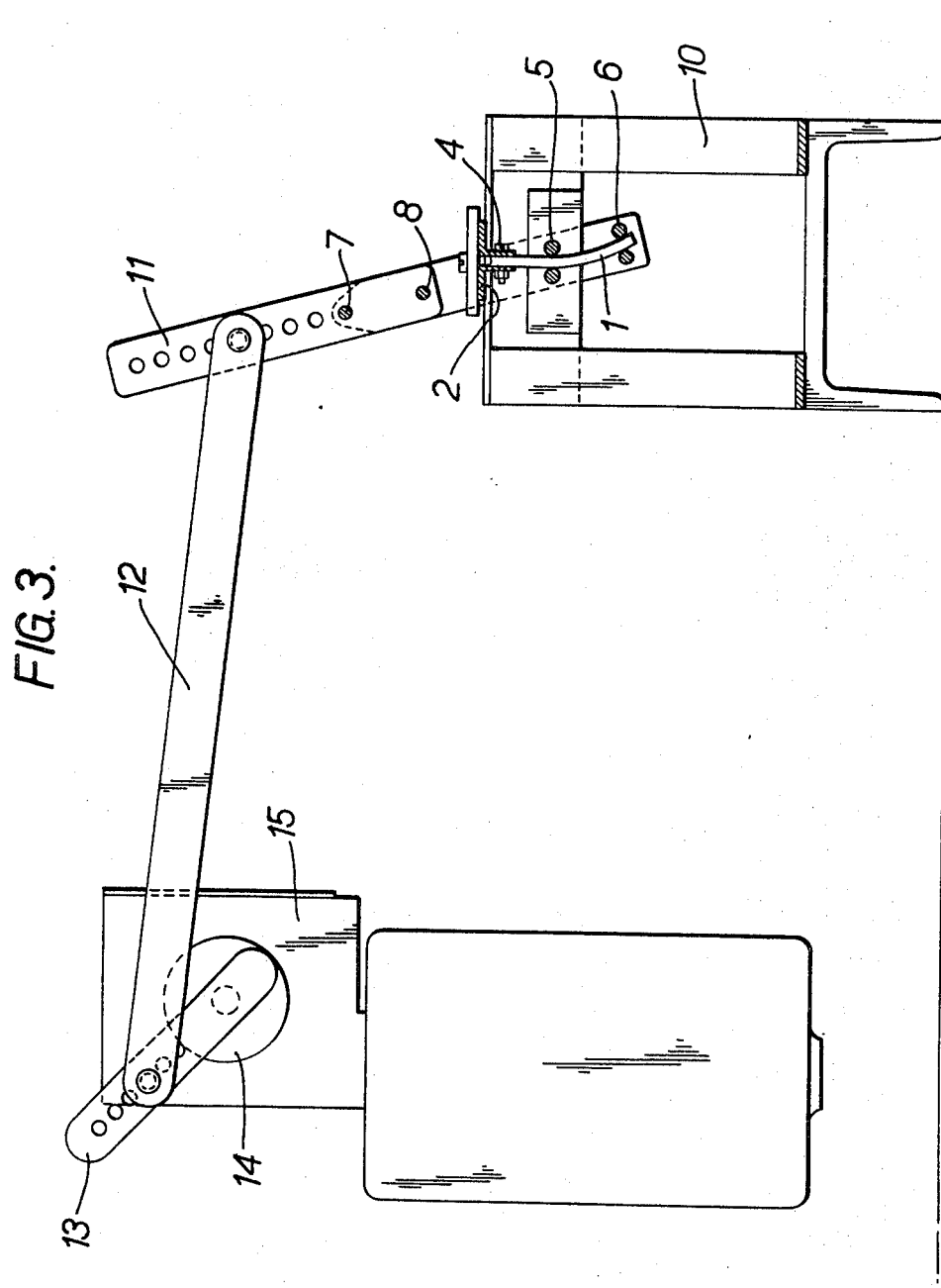

3,518,877
APPARATUS FOR TESTING PLASTIC MATERIALS
Alan Collier, Westhumble, Dorking, Surrey, Denis Sidney Ward, Walton-on-Thames, and Christopher Ronald Pout, Staines, Middlesex, England, assignors to The British Petroleum Company Limited, London, England
Filed Oct. 8, 1968, Ser. No. 765,911
Claims priority, application Great Britain, Oct. 10, 1967, 46,173/67
Int. Cl. G01n *3/32*
U.S. Cl. 73—100                            2 Claims

ABSTRACT OF THE DISCLOSURE

Apparatus for testing the flexibility of waxes and other flexible materials comprises fixed means for holding a strip of the material to be tested at an extremity thereof, a fixed guide having a smooth curved surface which contacts the strip when in place at a position along its length, and a movable guide which contacts the strip when in place at a position near the other extremity to that by which it is held. The movable guide is capable of oscillating in an arc in a plane perpendicular to that of the strip when in place, thereby causing the strip to flex about the fixed guide.

---

This invention relates to an apparatus for and a method of testing the flexibility of waxes, plastics, cardboard and other flexible materials.

Flexibility is an important physical property. The flexibility of microcrystalline waxes is particularly important, as this type of wax is useful for coatings which may be subjected to flexing. There is as yet no standard method by which the flexibility of different waxes may be compared, and accordingly a method is required by which this property may be assessed quickly and with a reasonable degree of reproducibility. This specification describes such a method, using an apparatus also described.

The principle of the method is that a specimen of the wax or other material is flexed, normally to destruction, under controlled conditions, and the flexibility is taken as the number of cycles of flexing required for breakage or other defined condition to occur. In practice, a number of specimens (normally 3) is used and the mean value taken. The method of flexing is important; the specimen must not be gripped at the position where it is being bent, and it must be bent on a smooth curved surface, the object being to approximate to the effect of bending an unsupported specimen in the hands.

Accordingly, the invention comprises an apparatus for testing the flexibility of waxes and other plastic materials which apparatus comprises fixed means for holding one or more strips of the material to be tested at an extremity thereof, a fixed guide having a smooth curved surface which contacts the strip when in place at a position along its length, and a movable guide which contacts the strip when in place at a position near the other extremity to that by which it is held, said movable guide being capable of oscillating in an arc in a plane perpendicular to that of the said strip when in place, and thereby causing the strip to flex about the fixed guide.

Preferably the strip is held in a vertical plane and in this case the movable guide oscillates in an arc in a vertical plane perpendicular to that of the strip. Preferably also there are two fixed guides, the guides being preferably disposed opposite one another on the larger surfaces of the strip. It is further preferred that there are two movable guides, preferably disposed opposite one another on the larger surfaces of the strip, although since the purpose of the movable guide or guides as to cause the strip to flex about the fixed guide or guides the movable guide or guides may have any form which allows this to occur.

The invention further comprises a method of testing the flexibility of waxes and other plastic materials which method comprises holding fixed one or more strips of the material to be tested at an extremity thereof, restraining the strip by means of a fixed guide having a smooth curved surface disposed so as to contact the strip at a position along its length, causing the extremity of the strip other than that by which it is held fixed to oscillate in an arc perpendicular to that of the strip, so that the strip is flexed about the fixed guide, and continuing the oscillation until a defined conditon of the strip is produced.

Usually the strip will be flexed until breakage occurs and the number of cycles required for this to take place is noted. However, it is envisaged, particularly for quality control purposes, that the specimen may be subjected to a fixed number of cycles of flexing and its condition then examined, visually or otherwise, and possibly compared with a standard spcimen. Alternatively, the number of cycles of flexing required for a change of condition of the specimen to take place, such as the incidence of cracking or a change of colour, may be noted. These and other variations known in the art in carrying out methods of testing are regarded as falling within the scope of the invention.

It is preferred to restrain the strip by means of two fixed guides preferably disposed opposite one another and in this case it is preferred that the free end of the strip oscillates in an arc whose extremities are on opposite side of the unflexed position of the strip. If there is only one fixed guide on one side of the strip it is preferred that the free end of the strip oscillates only on the same side of the strip as the guide.

It is important that whatever method of testing according to the invention is used the specimen strip should not be subjected to torsional stress or tensile stress.

The movable guide may, for example, be caused to oscillate by means of a motor and a system of levers connected thereto.

The variables which affect the flexibility are the ambient temperature, the rate of flexing, and the amplitude of flexing. The lower the temperature the less flexible is the specimen and the smaller the number of cycles of flexing before breakage occurs. Reproducibility improves as the number of cycles increases, but it is desirable that the test should not take an extended time. The rate of flexing is determined by the speed of motor used. Since this can only be altered by gearing or other means extraneous to the motor itself this is normally the most inconvenient of the variables to alter. The amplitude of flexing may be altered by varying the effective lengths of the lever system or, if another system is used for transmitting movement from a generator to the movable guide, the geometrical characteristics of this system may be varied as appropriate.

The rate of flexing and the amplitude of flexing should be chosen so that the test period is not inconveniently long but that the number of cycles to breakage or other defined condition is high enough for reproducibility to be acceptable. If either of these variables is too high localised heating may occur as a result of internal friction due to the working of the specimen about the position of flexure, particularly if the material of the specimen is a poor thermal conductor, and this may result in inaccuracy. For waxes, a temperature of up to 100° F., a rate of flexing of from 10 to 300 c.p.m. and an amplitude of flexing equivalent to 20 to 180° of angle may be used.

Taking the above factors into account we have found that, using an ungeared 60 r.p.m. motor operating through a system of levers so as to provide a rate of flexing of 60 c.p.m., an amplitude of flexing equivalent to about 70° of angle, and at room temperature (regarded for test purposes as 70° F.), acceptable flexibility values reproducible to about plus or minus 20% can be obtained.

The preparation of the specimen strips is important, since it affects the reproducibility of the flexibility values obtained. Thus, it has been found that whether a wax specimen has cut or cast surfaces is a variable affecting flexibility. We have found that a wax strip having one or more cast surfaces has higher flexibility than a strip having cut surfaces, and that flexibility also varies with the setting time of the wax, i.e. the period of time between the molten material being cast and the specimen strips being prepared. We have prepared wax specimen strips by the method now to be described, but obviously the dimensions given, both of the block from which the strips were prepared and the strips themselves, may be varied as necessary and convenient, provided that a standard procedure is adhered to.

Molten wax at approximately 190° F. is poured into brass trays having their inner surfaces amalgamated to allow easy removal of the wax block when cool. The trays are pre-heated to the same temperature as the molten wax and have sloping sides. Thus, the dimensions of the trays used are 3 ins. x 2 ins. at the base and 3½ ins. x 2½ ins. at the top, and a depth of ¾ inch. The wax is allowed to cool in air at the ambient temperature, the wax block removed from the tray, and cut into 12 sections of ¼ inch thickness, using a wire guillotine, along the shorter lengthwise dimension of the block. One end section, i.e. one of those having sloping sides, and the vertically-sided section next to it are discarded. Each of the remaining sections is then cut with the wire guillotine in a plane perpendicular to the vertical sides. The last cut leaves the other end section, which is discarded. The sections are trapezoidal in shape and are cut to give one strip per section, i.e. a total of 9 sections each of ⅛ inch thickness, ¼ inch width, and 2 ins. length. The first cut removes the upper, i.e. the shorter, horizontal surface of the strip, and is discarded, and the second cut produces the specimen strip to be examined. The remainder of the section is also discarded.

The apparatus of the invention will now be described, by way of example, with reference to the accompanying drawings, in which:

FIG. 1 is a vertical elevation,

FIG. 2 is a plan view, and

FIG. 3 is a vertical elevation about a plane perpendicular to that of FIG. 1.

The specimen strips 1 are gripped at an end by clamp 2. This clamp comprises 2 L-shaped members 3 (FIG. 2), positioned in an inverted back-to-back arrangement and held spaced apart by means of bolts 4, only one of which is numbered. The specimens pass between cylindrical rods 5, positioned on the upper halves of the specimens, and spaced apart by such an amount that the rods 5 touch the specimens, but do not grip them. Towards the ends of the specimens opposite to the clamped ends the specimens pass between rods 6 identical to rods 5 and an equivalent distance apart.

The ends of rods 6 are secured rigidly in strips 9. Rods 5 are supported by framework 10, which also supports clamp 2, and pass through strips 9, which can pivot about the ends of rods 5. Rods 7 and 8 pass through strips 9 and are secured rigidly thereto, rod 7 being above rod 8, so that rods 7, 8, and 6 and strips 9, together form a rigid framework pivoting about the ends of rods 5. Rods 7 and 8 pass through and are rigidly fixed to arm 11, which is in the form of a flat strip. Thus, arm 11 is always in the plane of the framework 7, 8, 6, 9. Arm 11 is provided with a number of holes, by one of which it is pivotably connected to arm 12. Arm 12 is pivotably connected to arm 13, which is also provided with a number of holes.

At a point near one end, arm 13 is rigidly connected to the rotor 14 of an electric motor 15. Thus, when the motor is operated, arms 11, 12 and 13 cooperate to cause the framework 7, 8, 6, 9 to oscillate about rods 5, the amplitude of oscillation being controlled by the effective lengths of arms 13 and 11. It will be seen that, since the specimens are gripped at their ends by clamp 2 and below this are held by rods 5, they will be bent, as shown in FIG. 3, about rods 5, the lower ends of the specimens tracing a shallow arc.

It should be noted that arms 11, 12, and 13 are shown in such a position that the lower ends of the specimens are near a limit of the arc and that FIGS. 1 and 2 are drawn correspondingly.

The cycles of oscillation are counted as follows. A photoelectric cell is mounted so that a light beam normally falls upon it, but that once per cycle the upper (free) end of arm 13 interrupts the beam, it being arranged that this interruption triggers an electronic counter. Neither the cell nor the counter are shown in the drawings.

In use, the specimen strips, prepared as previously described, are mounted by clamp 2 so as to grip appoximately the top quarter-inch of each strip. Rods 6 are very lightly lubricated, so that when the strips break they will fall between the rods. If the strips are prepared as described they will be of such a thickness that for them to be lightly held the pair of rods 5 should be one-eighth of an inch apart and similarly with the pair of rods 6. The arms 11, 12 and 13 are set to give the desired amplitude of oscillation and the motor speed set to provide the desired rate of oscillation. The motor is then switched on, the specimens are flexed and the number of cycles required for them to break noted from the counter. The specimens will probably each require a different number of cycles for breakage and the mean value is taken for the number of specimens tested. This mean value is defined as the flexibility.

The following Table 1 gives examples of typical flexibility measurements. In each of the nine sets of values given each horizontal row corresponds to one machine run and each set corresponds to the nine specimen strips obtained from one casting. With an occasional exception the values in each set are within plus or minus 20% of the means for that set. The measurements were carried out at 70° F. with a 70° amplitude and a rate of flexing of 60 c.p.m.

TABLE 1

| | | | |
|---|---|---|---|
| A | 45 | 48 | 60 |
| | 54 | 60 | 63 |
| | 58 | 65 | 67 |
| Average 58. | | | |
| B | 145 | 155 | 190 |
| | 200 | 205 | 265 |
| | 130 | 150 | 150 |
| Average 175. | | | |
| C | 210 | 195 | 180 |
| | 205 | 215 | 220 |
| | 230 | 215 | 170 |
| Average 205. | | | |
| D | 240 | 265 | 290 |
| | 200 | 205 | 235 |
| | 265 | 285 | 240 |
| Average 245. | | | |
| E | 360 | 360 | 390 |
| | 445 | 515 | 355 |
| | 415 | 385 | 415 |
| Average 400. | | | |
| F | 420 | 420 | 380 |
| | 520 | 470 | 420 |
| | 530 | 475 | 550 |
| Average 460. | | | |
| G | 545 | 565 | 600 |
| | 530 | 465 | 560 |
| | 530 | 530 | 530 |
| Average 540. | | | |
| H | 900 | 850 | 790 |
| | 680 | 800 | 610 |
| | 600 | 760 | 610 |
| Average 730. | | | |
| I | 1,340 | 1,400 | 1,350 |
| | 1,200 | 1,100 | 1,100 |
| Average 1,250. | | | |

The following Table 2 shows the flexibility values obtained for a number of commercially available microcrystalline waxes in relation to their penetration and melting point, as determined by ASTM Methods D.1321/65 and D.938/60, respectively. The flexibility variables were the same as those given above.

TABLE 2

|  | A | B | C | D | E | F | G | H | I | J | K |
|---|---|---|---|---|---|---|---|---|---|---|---|
| Penetration, mm. 10: | | | | | | | | | | | |
| At 25° C | 11 | 12 | 25 | 17 | 26 | 24 | 25 | 27 | 27 | 8 | 20 |
| At 40° C | 57 | 92 | 94 | 90 | 72 | 95 | 88 | 95 | 91 | 21 | 114 |
| Melting point, °F | 159.1 | 172.5 | 155.5 | 173.5 | 175.3 | 172.4 | 147 | 145.4 | 167.7 | 186.8 | 162.5 |
| Flexibility, cycles at 70° F | >1,000 | 750 | 300 | 850 | 460 | 540 | 730 | >1,000 | 560 | 60 | 70 |

What we claim is:

1. Apparatus for testing the flexibility of waxes and other flexible materials which apparatus comprises fixed means for holding one or more strips of the material to be tested at an extrimity thereof, each said strip having larger surfaces in the plane of the strip than in a plane perpendicular thereto, two fixed guides disposed opposiite one another, each said guide having a smooth curved surface, and the smooth curved surfaces of said guides contacting the said larger surfaces of the strip when in place at a position along its length, and a movable guide which contacts the strip when in place at a position near the other extremity to that by which it is held, said movable guide being capable of oscillating in an arc in a plane perpendicular to that of the said strip when in place and thereby causing the strip to flex about the fixed guide.

2. Apparatus for testing the flexibility of waxes and other flexible materials which apparatus comprises fixed means for holding one or more strips of the material to be tested at an extremity thereof, each said strip having larger surfaces in the plane of the strip than in a plane perpendicular thereto, a fixed guide having a smooth curved surface which contacts the strip when in place at a position along its length, and two movable guides disposed opposite one another so as to be in contact with the larger surfaces of the strip when in place at a position near the other extremity to that by which the strip is held, each said movable guide being capable of oscillating in an arc in a plane perpendicular to that of the said strip when in place and thereby causing the strip to flex about the fixed guide.

References Cited

UNITED STATES PATENTS

| 1,485,835 | 3/1924 | Bothezat et al. | 73—91 |
| 2,528,918 | 11/1950 | Sfanius | 73—100 |
| 3,031,886 | 5/1962 | Larsson et al. | 73—91 |
| 3,368,394 | 2/1968 | Pasinski et al. | 73—100 |
| 3,381,526 | 5/1968 | Rastogi et al. | 73—100 X |

JERRY W. MYRACLE, Primary Examiner

U.S. Cl. X.R.

73—91

PO-1050
(5/69)

UNITED STATES PATENT OFFICE
CERTIFICATE OF CORRECTION

Patent No. 3,518,877         Dated July 7, 1970

Inventor(s) Alan Collier, Denis Sidney Ward and Christopher Ronald Pout

It is certified that error appears in the above-identified patent and that said Letters Patent are hereby corrected as shown below:

Col. 1, line 72, for "as" read --is--;

Cols. 5 and 6, TABLE 2, for "Penetration, mm. 10:" read --Penetration $\frac{mm}{10}$--;

Cols. 5 and 6, TABLE 2, column headed "K", for "20" read --25-- and for "162.5" read --162.0--.

SIGNED AND
SEALED
NOV 3 1970

(SEAL)
Attest:

Edward M. Fletcher, Jr.
Attesting Officer

WILLIAM E. SCHUYLER, JR.
Commissioner of Patents